Dec. 13, 1960 C. H. WERTH 2,963,829
GRINDING MACHINES
Filed Dec. 9, 1955 5 Sheets-Sheet 1

INVENTOR.
CARL H. WERTH
BY
*Searman & Searman*
ATTORNEYS

Dec. 13, 1960 C. H. WERTH 2,963,829
GRINDING MACHINES
Filed Dec. 9, 1955 5 Sheets-Sheet 2

INVENTOR.
CARL H. WERTH
BY Harman & Harman
ATTORNEYS

Dec. 13, 1960 C. H. WERTH 2,963,829
GRINDING MACHINES
Filed Dec. 9, 1955 5 Sheets-Sheet 3

INVENTOR.
CARL H. WERTH
BY *Searman & Searman*
ATTORNEYS

Dec. 13, 1960  C. H. WERTH  2,963,829
GRINDING MACHINES
Filed Dec. 9, 1955  5 Sheets-Sheet 4
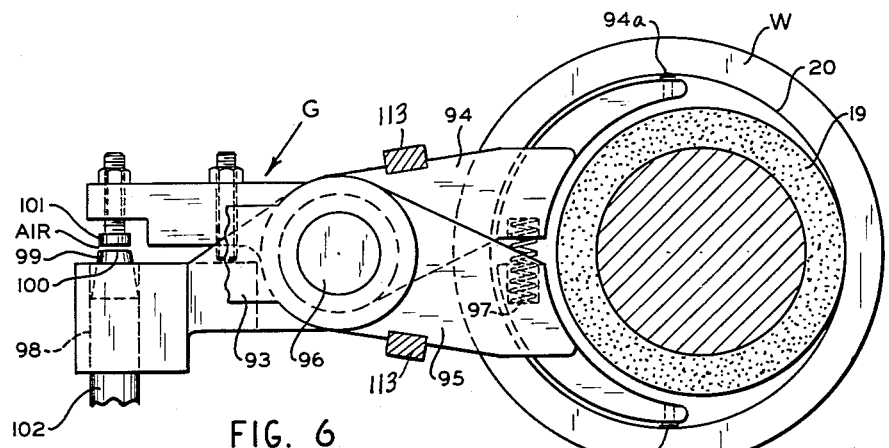
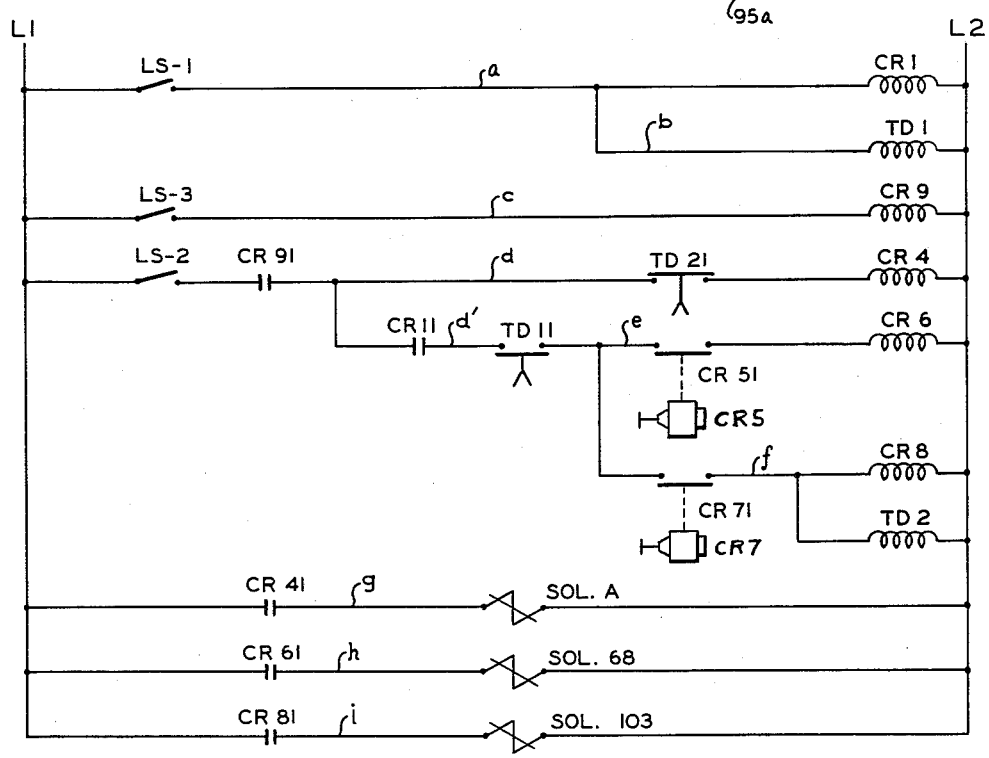
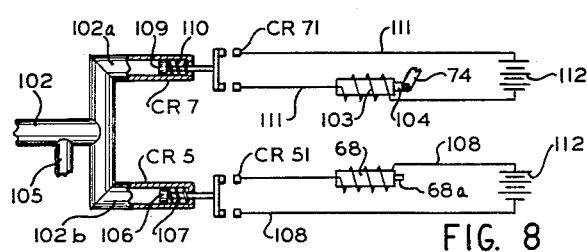
INVENTOR.
CARL H. WERTH
BY
ATTORNEYS Dec. 13, 1960 C. H. WERTH 2,963,829
GRINDING MACHINES
Filed Dec. 9, 1955 5 Sheets-Sheet 5

INVENTOR.
CARL H WERTH
BY *Yearman & Yearman*

ATTORNEYS

United States Patent Office 2,963,829
Patented Dec. 13, 1960

2,963,829

GRINDING MACHINES

Carl H. Werth, Saginaw, Mich., assignor to Hoern & Dilts, Inc., Saginaw, Mich.

Filed Dec. 9, 1955, Ser. No. 552,029

25 Claims. (Cl. 51—50)

This invention relates to production type, precision machine tools and more particularly to grinding heads for automatic or semi-automatic grinding machines.

One of the prime objects of the invention is to design a grinding head having a revolving grinding tool which moves into a rotating workpiece and precision grinds it to size after which the grinding wheel automatically retracts so that a work holding table can be indexed and the operation repeated on a successive workpiece.

While I am informed that others have attempted to design grinding machines in which the grinding wheel or tool is automatically withdrawn when the workpiece is ground to size I do not believe that anyone has designed a machine which operates in this manner with any degree of accuracy and to my knowledge no machines of this type have ever appeared on the market.

It is a principal object of the instant invention to design a machine in which the diameter of the work is continuously measured as the grinding progresses and the feed of the grinding tool is interrupted and the tool is subsequently withdrawn, only when by actual measurement, it is determined that certain sizes have been actually ground. The novel machine which I will later describe in detail embodies a grinding head in which the feed of the grinding wheel is interrupted at a designated point according to a gauge for measuring the internal diameter of the workpiece and the wheel is then permitted td finish grind until the exact diameter is obtained after which the wheel is automatically immediately retracted.

A further object of the invention is to design a grinding machine or head of the character described in which the gauge is retracted when the tool is withdrawn to permit indexing of the workpiece and moves back into another workpiece when the tool moves back into grinding position.

Another object of the invention is to provide a grinding head in which the abrasive wheel is automatically trued as the wheel is retracted or withdrawn so that it will be in condition to immediately machine a succeeding workpiece.

A further object of the invention is to design a grinding head for a high production, precision grinding machine in which automatic control mechanism is provided for accurately and positively feeding the grinding tool into the work an increment at a time according to the amount of material it is desired to remove.

A further object of the invention is to design automatically controlled mechanism of the character described wherein the tool is fed radially into the revolving workpiece while it is making an axial pass across the surface being machined.

A still further object of the invention is to provide a grinding machine of reliable and practical design which is relatively economical to manufacture and assemble, and which permits the low cost, precision grinding of workpieces on a quantity production scale.

With the above and other objects in view, the present invention consists in the combination and arrangements of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

In the drawings:

Fig. 6 is an enlarged, top plan view showing the gauge which measures the diameter of the workpiece and controls means for interrupting the feed of the tool and returning it to substantially its original position.

Fig. 8 is a schematic view of control means which could be associated with the gauge in a semi-automatic operation.

Fig. 9 is a circuit diagram illustrating control circuits for a machine whose operation is entirely automatic.

Figure 1:
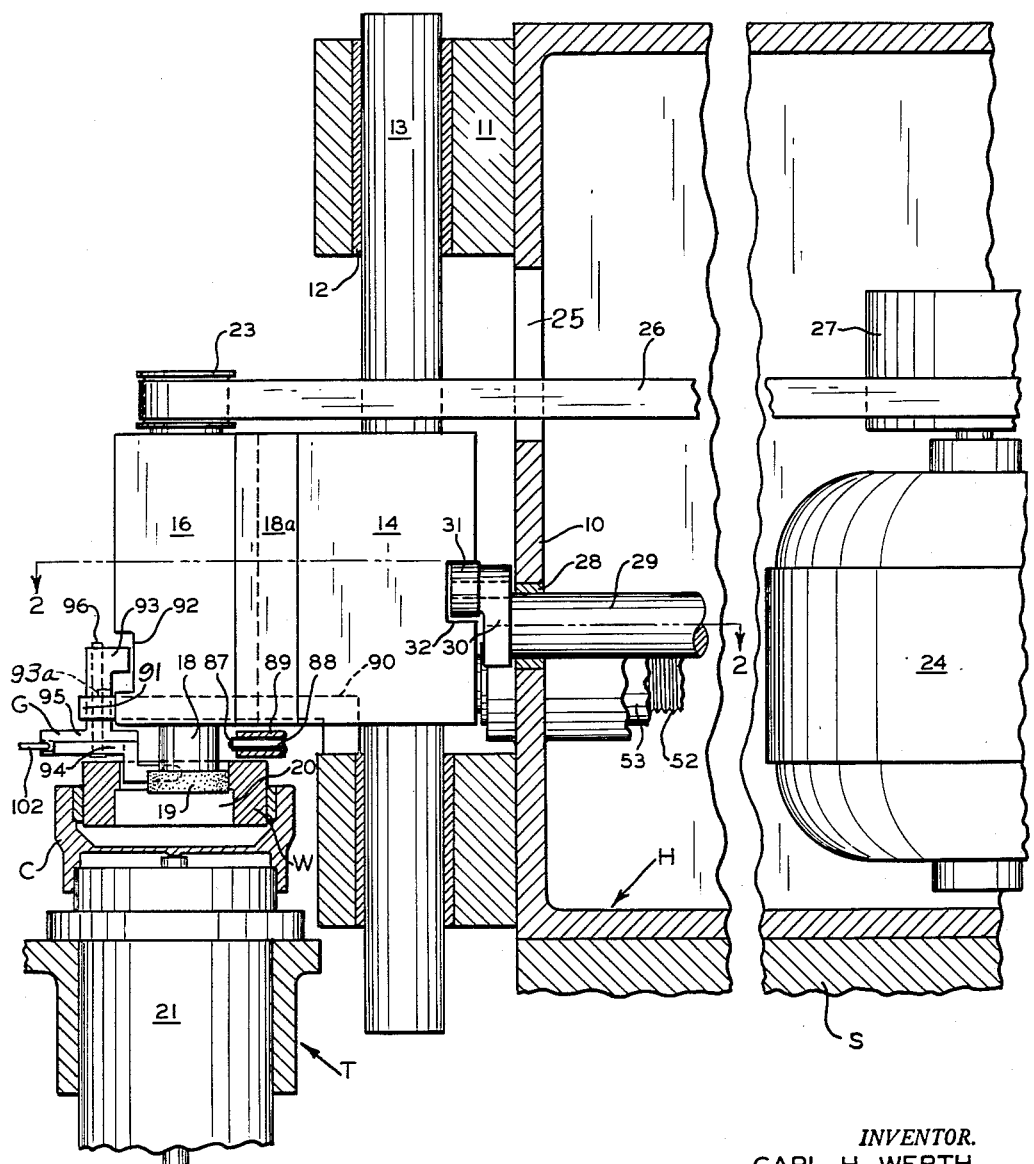
Fig. 1 is a sectional side elevational view through a grinding head taken on the line 1—1 of Fig. 2 and showing the grinding wheel in position within a workpiece, the mechanism for feeding the wheel or tool radially being omitted from the view in the interests of clarity.

Referring now more particularly to the accompanying drawings in which I have shown a preferred embodiment of the invention a letter H generally indicates a generally rectilinear grinding head housing which is particularly adapted to support the various operating elements which will be described. It is to be understood that a plurality of such grinding heads may be supported in circumferentially spaced relation at peripherally arranged tool stations S above an indexible table T which is provided with spaced apart work holders or chucks C. Since the grinding heads H which may be used to grind the different surfaces of a workpiece are for purposes of this application identical, however, only one need be described and illustrated in the drawings.

Figure 2:
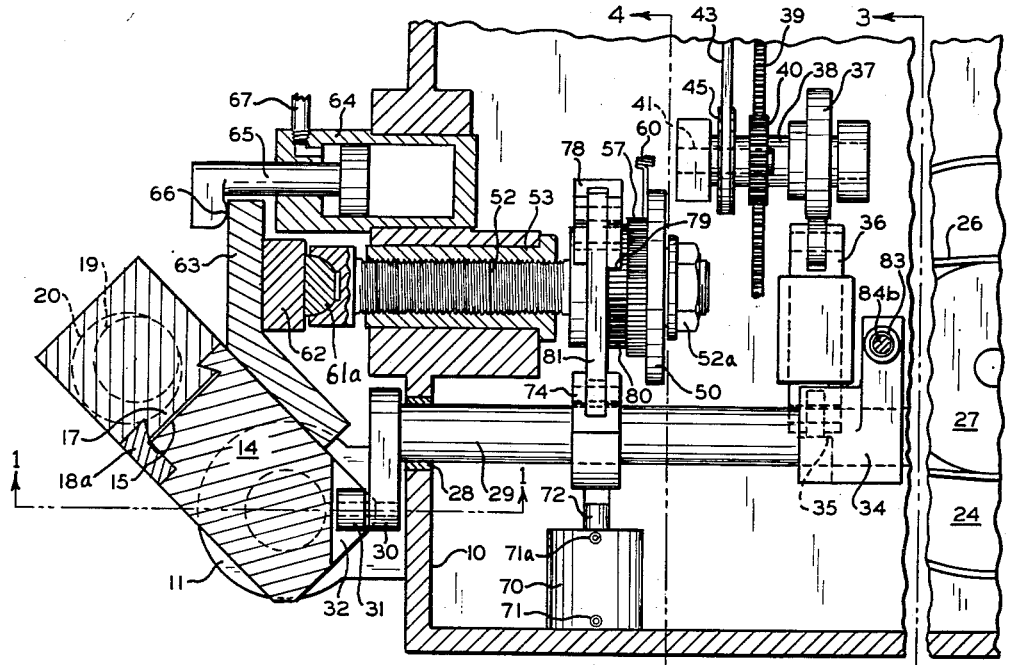
Fig. 2 is a top plan view taken on the line 2—2 of Fig. 1.

Mounted on the front wall 10 of the grinding head housing H which is shown in Fig. 1 are a pair of spaced apart blocks 11 having vertically aligned bushings 12 therein for slidably supporting a shaft 13. A spindle support 14 fixed on the shaft 13 is recessed (Fig. 2) as at 15 to receive a spindle housing 16 having a dovetail tenon 17, and a clamp arm 18a secured by a bolt or the like, is provided to maintain the spindle housing 16 rigidly in position. A spindle 18 which is preferably supported by suitable roller bearings within the housing 16 has an abrasive grinding wheel 19 fixed on its lower end which in Fig. 1 is disposed within the bore 20 of a workpiece W. A conventional diaphragm chuck C mounted on a revolving spindle 21 may be provided to support the workpiece W on the indexible table T.

Mounted on the upper end of grinding spindle 18 is a pulley 27 on the armature shaft of the motor 24. 19 from a vertically disposed motor 24 supported within the grinder housing H. It will be observed that an opening 25 is provided in the front wall 10 of the housing to pass a belt 26 which is trained around the pulley 23 and a pulley 27 on the armature shaft of the motor 24

The grinding wheel 19 which is selected for a particular operation will be considerably less in diameter than the bore 20 of the workpiece W and accordingly the grinding wheel will be radially movable or adjustable within the workpiece. Supported in suitable bearings 28 in the grinder housing H is a rock shaft 29 having a lever 30 fixed on the front end thereof. A roller 31 mounted on lever 30 is received within a recess 32 provided in the spindle support block 14 and plainly, if shaft 29 is rocked, the lever 30 will impart its movement to the grinding spindle 18.

Figure 3:
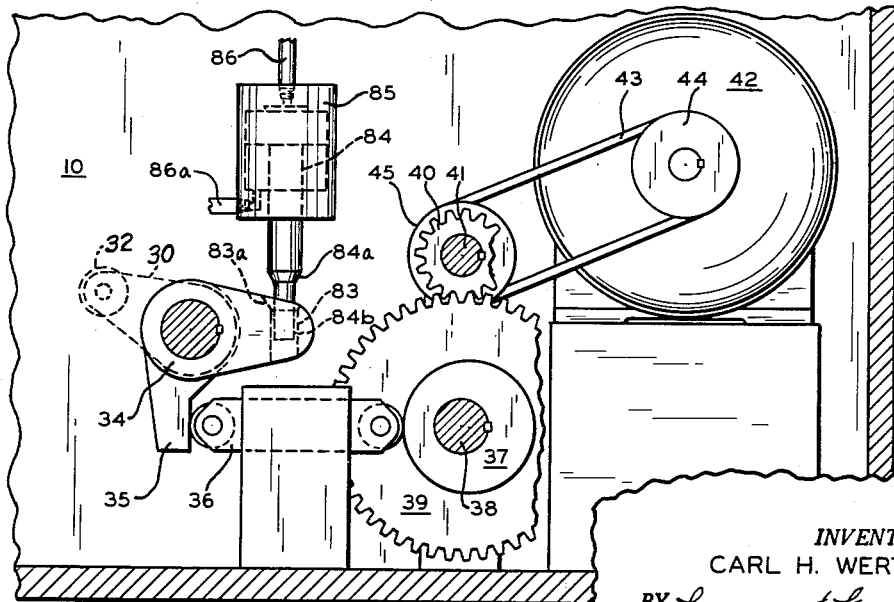
Fig. 3 is a fragmentary, transverse, sectional view taken on the line 3—3 of Fig. 2 with the means for radially adjusting the grinding wheel again omitted in the interests of clarity.

Keyed on the rear end of shaft 29 is a bell crank lever 34 (Figs. 2 and 3), and a tappet 36, which has one end in engagement with a cam 37 on a camshaft 38, is adapted to engage the end 35 of the lever as shown. A reduction gear 39 on cam shaft 38 is in mesh with a gear 40 on stub shaft 41 which is driven from a horizontally disposed motor 42. In the embodiment shown a belt 43 leading from a pulley 44 on the armature shaft of the motor 42 is trained around a pulley 45 on the shaft 41 and drives the latter.

If the grinding wheel 19 is initially positioned at the lower end of the portion of the bore in the workpiece W to be machined and shaft 29 is rocked in a clockwise (Fig. 3) direction by cam 37, the rotating wheel 19 will feed upwardly to the top of the bore in the workpiece. Thence the weight of spindle support block 14 and spindle housing 16 will cause the wheel to drop back to initial position during the fall of cam 37.

Figure 4:
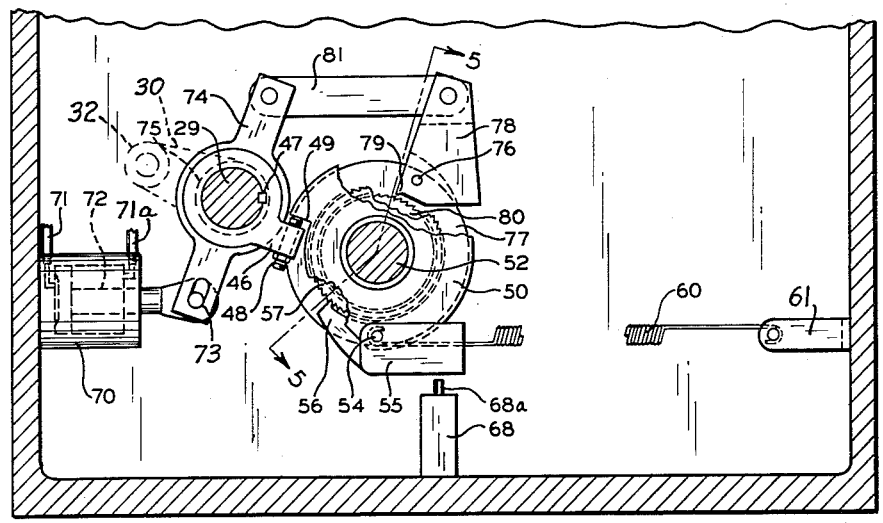
Fig. 4 is a fragmentary, transverse, sectional view taken on the line 4—4 of Fig. 2.

During the rise of cam 37 a lever 46 which is keyed to rock shaft 29 as at 47 moves in a clockwise (Fig. 4) direction. The lever 46 has an adjusting screw 48 thereon which, when the wheel 19 is at the lower end of bore 20, is in engagement with a shoulder 49 on a ratchet pawl support collar 50 revolvably mounted on a bushing 51 on the rear end of an adjusting or lead screw 52. The latter screw 52 which is mounted in a stationary nut 53 in the front wall 10 of the grinding head H and has a nut 52a maintaining the collar 50 in position is employed to feed the grinding wheel 19 in increments radially into the workpiece in a manner which will be later described. Pivotally mounted on the collar 50 as at 54 is a clevis member 55 having an integral extending pawl portion 56 which is maintained in engagement with a ratchet wheel 57, fixed on the screw 52, by the offset weight of the clevis portion 55. The latter wheel 57 is bolted as at 58 to a shoulder 59 on the screw 52. A spring 60 under tension is connected to the pin 54 and to a bracket 61 on the side wall of the grinding head housing H and urges collar 50 in a counterclockwise (Fig. 4) direction. When the lever 46 moves slightly away from shoulder 49, the spring 60 moves the collar 50 counterclockwisely and the pawl 56 tends to pivot slightly and skips over the tooth tending to restrain it into the adjacent notch. During this time the lead screw 52 remains in the same position. However, when the fall of the cam 37 permits the lever 46 to return to initial position, the collar 50 and pawl 56 are moved clockwisely (Fig. 4) and operate to revolve the ratchet wheel 57 one increment or "tooth" in a clockwise direction. Thus the wheel 19 feeds into the work on the down stroke of the wheel during the fall of cam 37 when the weight of the housing 16 is returning the grinding wheel and every time cam 37 completes a revolution the grinding wheel has been fed another increment radially into the workpiece.

Figure 10:
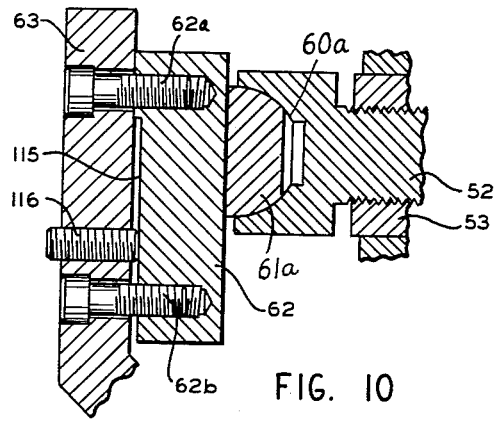
Fig. 10 is a fragmentary, sectional, side elevational view of the front end of the feed screw illustrating how the grinding spindle assembly can be adjusted angularly relative to the screw.
Figure 12:
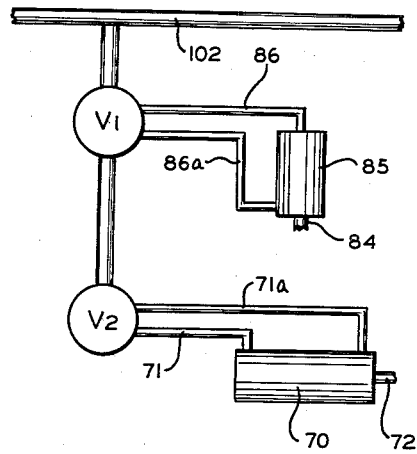
Fig. 12 is a schematic view showing the valves for operating the air cylinders.

Provided in the front end of feed screw 52 is a socket 60a (Fig. 2) with a flatted ball type joint 61a received therein which projects slightly from the socket 60a. A block 62, of sufficient length vertically so as to be in engagement with the ball joint 61a throughout the entire vertical stroke of the spindle support block 14 on shaft 13, is fixed on an angular plate 63 which may be bolted or otherwise suitably secured to the support 14. The plate 63 is fixed to the block 62 by bolts 62a and 62b (Fig. 10) in a manner which permits it to be angularly adjusted relative thereto as will later become apparent. A fluid pressure cylinder 64 (Fig. 2), provided in head H, has a plunger rod 65 with an arm 66 thereon which engages the plate 63, and a line 67 supplies fluid under a predetermined pressure so that the plate 63 is forced inwardly as screw 52 is moved inwardly and the grinding wheel 19 is thereby fed radially into the work.

Figures 5, 7:
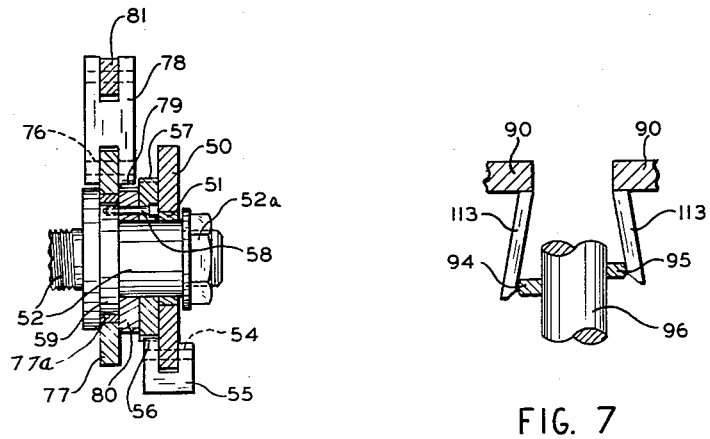
Fig. 5 is an enlarged, fragmentary, side view of the rear end of the feed screw.
Fig. 7 is a fragmentary, front view illustrating means for mechanically compressing the gauge caliper arms when the latter are lifted out of the workpiece with the grinding wheel.

Slidably mounted on a bracket extending from head H is a gauge G which is disposed within the bore 20 while the grinding operation is being performed. When the internal diameter of the workpiece is ground to a size just off the finish size, a solenoid 68 (Fig. 4) is energized by the gauge in a manner which will later be described and the armature core plunger 68a thereof moves outwardly to pivot pawl 56 so that it releases ratchet wheel 57. On further revolution of cam 37 then, the screw 52 remains in adjusted position and the grinding wheel will "spark out" until the work is ground to the finish size. When the finish size is reached, the gauge G reacts in a manner to be described to cause the release of air under pressure from a supply source into cylinder 70 through line 71 which forces piston rod 72 outwardly. The rod 72 is connected by a pin and slot connection as at 73 to a lever 74 which is revolvable on a bushing 75 provided on the shaft 29. Pivotally mounted as at 76 on a collar 77 which revolves on bushing 77a (Fig. 5) is a clevis 78 having an integral pawl or tooth 79 disposed opposite a second ratchet wheel 80 which is also fixed on screw shaft 52. It will be observed that the teeth on wheel 80 are arranged oppositely to the teeth on ratchet wheel 57. Clevis 78 is connected to lever 74 by a link 81 and when piston rod 72 is forced outwardly lever 74 pivots in a counterclockwise (Fig. 4) direction and clevis 78 which has tooth 79 normally out of engagement with the teeth on ratchet wheel 80 is pivoted so that tooth 79 comes into engagement with the teeth on ratchet wheel 80. The pawl or tooth 79 engages between a pair of teeth on ratchet wheel 80 and as clevis 78 continues to pivot, the ratchet wheel 80 is revolved through a member of increments sufficient to return lead screw 52 forwardly or outwardly to almost the position it was in at the beginning of the grinding operation. It will not be returned quite to this position since the grinding wheel will be automatically dressed prior to performing a grinding operation on another workpiece. Fluid under pressure is introduced through a line 71a to return piston rod 72 to original position while the fluid in cylinder 70 is simultaneously bled off through the line 71, and clevis 78 is thus pivoted free of the teeth on ratchet wheel 80 after returning the ratchet wheel 80 without changing the position thereof.

Provided in the bell crank lever 34 is a bore 83 (Fig. 3) having a countersunk portion 83a. A piston rod 84 in fluid pressure (air) cylinder 85 has a tapered surface 84a and a reduced portion 84b which is normally freely slidable in the bore 83. The spindle housing 16 is lifted sufficiently for the grinding wheel or tool to be lifted out of the workpiece when fluid under pressure is introduced into cylinder 85 through line 86 and surface 84a engages the marginal wall of the portion 83a of the slot 83 to pivot lever 35 in a clockwise (Fig. 3) direction. A diamond 87 mounted on a rod 88 which is received in a holder 89 depending from the head H trues or dresses the revolving grinding wheel 19 as the wheel moves upwardly past it so that the wheel is ready for the next workpiece when the latter is indexed into position. A suitable gauge is provided on the dressing assembly which permits adjustment of the rod 88 radially as desired.

As has been noted the gauge G is vertically slidable relative to head H from which it is supported and in Fig. 1 a bracket 90 having a slide bearing 91 is shown supporting the gauge G for vertical movement relative to the head H. The spindle housing 16 has a recess 92 provided therein in which an extension arm 93 projecting from gauge G is disposed. As the spindle housing 16 lifts after completion of the grinding operation the lower marginal wall of recess 92 will engage arm 93 and lift the gauge out of the workpiece also so that the worktable T can be indexed.

The gauge G comprises a pair of caliper levers or arms 94 (Fig. 6) and 95 which are pivotally mounted intermediate their ends on a post 96, the levers having diamond work engaging inserts 94a and 95a. A spring 97 tends to spread the front ends of the levers 94 and 95 so that they will continue to move into the wall of the bore 20 as the grinding operation proceeds. The rear end of arm 94 has a passage 98 therein which terminates in a nozzle 99 with a reduced orifice 100 therein adjacent a recessed portion of the adjacent arm 95. The rear end of arm 95 has an adjusting screw 101 arranged immediately opposite the orifice 100 and in alignment therewith. Clearly as the front ends of the arms 94 and 95 spread, the air escape clearance between the orifice 100 and flat head of screw 101 is decreased which, of course, tends to set up a back pressure or increase in pressure in the air line 102 which is connected into the passage 98.

In Fig. 8 I have shown a schematic diagram illustrating a very simple pneumatic-electric circuit which might be used to operate the solenoid 68 and lever 74 is a semi-automatic operation. For the sake of convenience only I have shown a solenoid 103 with its armature core 104 directly connected to the lever 74 in place of the double acting air cylinder 70 shown in Fig. 4, however, obviously the solenoid 103 could be and is in practice employed to operate the cylinder 70. The line 102 is shown as having closed upper and lower branches 102a and 102b respectively and air is shown as being supplied from a source of compressed air through the line 105. Connected with branch 102b is a pneumatic relay CR5 including a piston 106 having pairs of contact terminals CR51. A spring 107 under a predetermined degree of compression relative to the pressure of the air supplied through supply line 105 normally maintains the terminals CR51 open. When the pressure in line 102 and the branches 102a and 102b increases to a predetermined degree the spring 107 will be further compressed and the pairs of terminals CR51 will engage so that solenoid 68 in the circuit 108 will be energized. The system is set so that the terminals CR51 "make" at the time the surface being ground is just under the finish size (at what may be conveniently called the "approach" size) and pawl 56 is pivoted out of engagement by solenoid 68 to free the lead screw 52.

The branch 102a is similarly connected with a pneumatic relay CR7 which includes a piston 109 having pairs of terminals CR71 which are normally maintained in open position by a spring 110 under compression. The spring 110 is, however, under a greater degree of compression than is spring 107 so that a slightly greater pressure is required to close contacts CR71 than contacts CR51. This pressure has built up in the line 102 when the finish size is reached and if solenoid 103 in circuit 111 is energized the lever 74 will be pivoted and the lead screw will be returned to substantially its initial position. For purposes of this illustration only I have shown each circuit 108 and 111 as provided with a power source 112.

Once the solenoids 68 and 103 have been energized the spindle support block 14 may be manually or automatically raised to lift the wheel 19 and gauge G out of the workpiece so that the worktable can be indexed and a new workpiece brought into position under the wheel. As noted air cylinder 85 is employed to raise the grinding wheel and gauge G out of the workpiece. Again for the purpose of illustrating a semi-automatic operation only I show stationary arms 113 (Fig. 7) which terminate immediately above the workpiece and converge upwardly relative one to another toward the bracket (90) sections from which they depend and, as the gauge G lifts, force the caliper ends of the gauge arms 94 and 95 inwardly toward one another. By the time the gauge arms have little more than cleared the workpiece the arms 94 and 95 are in a compressed position which will later permit them to be dropped into the bore of the next workpiece to be machined. Of course, when the front or measuring ends of arms 94, 95 are moved toward one another the rear ends are spread and the pressure condition in line 102 is restored to normal so that contacts CR51 and CR71 are opened and pawl 56 and lever 74 return to normal position ready for the next grinding operation.

When the next workpiece W is in position the air cylinder 85 is actuated to force piston 84 upwardly and this may be done by bleeding air from line 86 and simultaneously forcing air in through line 86a. The weight of the block 14 and spindle 16 drops the grinding wheel into the next workpiece and, of course, the gauge G is simultaneously permitted to drop into the workpiece, the arms 113 holding the gauge arms 94 and 95 in compressed relation until they have entered the bore of the new workpiece whence the arms 113 release them and spring 97 forces them into engagement with the interior wall to be ground. The maximum spread of legs 113 is such as to drop the gauge into the unground bore and the lower surfaces of arms 113 tend to cam the gauge arms inwardly when the gauge is being withdrawn from the workpiece. A stop 93a on the gauge engages the bracket 90 which is fixed on the frame H and limits the drop of the gauge G in the elongated slot 92 prior to the time the wheel 19 has dropped the full distance into the workpiece (see Fig. 1). Accordingly when the wheel 19 is reciprocating in its grinding stroke the gauge G remains stationary. With the pressure condition within line 102 restored to normal as noted, contacts CR51 and CR71 will remain open until the approach and finish sizes are ground respectively in the new workpiece.

The spindles 21 on the indexible table T are continuously revolved in one direction while the spindles 16 are continuously driven in the opposite direction. The cylinder 85 could be simply a conventional lever operated type jack which need not further be described and the revolvable worktable T can be indexed manually or with suitable motor driven Geneva mechanism. An indexible table of the type which I actually employ is shown in Patent No. 2,633,777 granted April 7, 1953 to Joseph H. Hoern.

Preferably the worktable T will be automatically operated in timed relation with the head H by employing conventional control means which form no part of the instant invention and control means for operating the head H will be provided so that the operation of the grinder is continuous and all the operator need do is unload and reload workpieces W into the chucks at an unloading station but clearly, of course, the table T and head H could be manually operated. The above constitutes a full description of a simple workable embodiment of the invention whose sequential operation is described in detail as follows:

The eair cylinder 85 which holds head H, and therefore also the gauge G, in "up" position above the workpiece W while the worktable T is indexing, is actuated to force air in through line 86a and bleed air from cylinder line 86, when the table has completed its index, to raise piston rod 84. This permits shaft 29 and bell crank lever 34 to be pivoted in a counterclockwise (Fig. 3) direction by the weight of spindle 16 and support block 14 which descend until the grinding wheel 19 and arms 94 and 95 are disposed within the bore 20 of the workpiece at the lower end thereof. The leg 35 of lever 34 is then in engagement with the tappet or slide 36 as the latter rides on the dwell surface of cam 37. When cam 37 pushes tappet 36 outwardly, shaft 29 is rocked in a clockwise (Fig. 4) direction by lever 35 and lever 46 moves clockwisely away from collar 50. The pull of spring 60 causes collar 50 to follow lever 46 and pawl 56 to skip over the tooth on wheel 57 which is counterclockwisely (Fig. 4) adjacent it and into the adjacent (counterclockwisely) notch. As the shaft 29 is being rocked by cam 37, the revolving grinding wheel 19 is, of course, being moved upwardly. When the dwell surface of cam 37 permits shaft 29 to return to original position it is the weight of the spindle assembly which returns it and forces the wheel 19 downwardly in a grinding "pass." As shaft 29 returns to position, lever 46 which is in engagement with shoulder 49, returns collar 50 clockwisely (Fig. 4) and pawl 56 moves ratchet wheel 57 clockwisely (Fig. 4) one increment. Since the wheel 57 is mounted on lead screw 52 or arranged to operate the screw 52 the lead screw is moved through a part of a revolution by the pawl 56. This movement will be in a rearward or inward direction and, since the piston 65 of air cylinder 64 will cause plate 63 to follow the screw 52, the wheel 19 will be fed radially one increment into the workpiece as the grinding wheel 19 descends. It will be observed that the feed of wheel 19 vertically and radially is effected in one instance by the weight of the spindle (16) and support block (14) assembly and in the other case by the pressure of the fluid in cylinder 64. Obviously such an arrangement will prevent damage to the mechanism if the various elements of the machine should be operated out of proper sequence. The revolution of cam 37 and the advancement of wheel 19 radially into the work continues in the above described manner until the "approach" size is reached and gauge levers or jaws 94 and 95 spread sufficiently so that the back pressure in branch air line 102b actuates penumatic relay CR5 and makes contacts CR51. Solenoid 68 is then energized and its core armature moves outwardly to pivot element 55 so that pawl 56 is removed from wheel 57. Further revolution of cam 37 then will pass the grinding wheel 19 upwardly but will no longer feed it radially and the wheel "sparks out" until the "finish" size is reached. At this point the jaws 94 and 95 of gauge G are so spread that the increased pressure in branch air line 102a actuates pneumatic relay CR7 and "makes" terminals CR71. This energizes solenoid 103 which preferably controls air cylinder 72 so that piston 72 is forced outwardly and lever 74 is pivoted in a clockwise (Fig. 4) direction. Pawl 78 is pivoted about pin 76 and moves into engagement with the ratchet wheel 80 so that further turning of lever 74 returns the ratchet wheel 57 and lead screw 52 substantially to initial position.

When air is admitted to air cylinder 85 through line 86 and piston 84 is forced downwardly, the shoulder 84a engages the surface 83a and pivots lever 34 clockwisely (Fig. 3) so that the revolving grinding wheel 19 which is no longer in engagement with the work surface is lifted entirely out of the workpiece. As noted, in so passing upwardly, it is trued by the dressing diamond 87 and the gauge jaws 94 and 95 may be compressed by arms 113 so that contacts CR51 and CR71 are broken and the solenoids 68 and 103 are deenergized. When these elements are deenergized the pawl 56 returns to the ratchet wheel 57 and piston 72 in cylinder 70 is returned to original position and pivots lever 74 counterclockwisely so that pawl 78 is moved out of engagement with ratchet wheel 80.

Obviously the stroke of piston 72 should be such that the lead screw is returned a maximum distance just short of the initial position of the grinding wheel when it is set to grind the first workpiece. The diameter of the wheel 19, of course, decreases slightly after each workpiece is ground and as grinding proceeds the lead screw will have to be advanced to compensate for the portion of the wheel removed during the grinding and truing operations. This is accomplished by returning the lead screw 52 a distance slightly less than it advanced into the work during the grinding operation.

The block 62 is, as noted, always in contact with ball joint 61a through the entire up and down travel of the grinding wheel assembly. If the grinding wheel tends to grind a taper rather than a true cylindrical bore as would occur if the wheel 19 after some use were for some reason worn to a slightly tapered form which was not concentric with the axis of reciprocation the plate 63 can be adjusted relative to block 62 to compensate. Note that the block 62 has a recessed portion 115 (Fig. 10) and that bolts 62a and 62b secure the block 62 to the plate. The openings in plate 63 through which the bolts extend are not threaded so the plate 63 can rock toward block 62 about the area of engagement of these surfaces. A set screw 116 is provided as shown and when bolt 62b is loosened adjustment of set screw 116 will pivot plate 63 and the spindle assembly relative to block 62 about bolt 62a. Bolt 62b can then be tightened down to lock the members in adjusted position.

In actual practice the operation of the machine is entirely automatic except for loading and reloading of the workpieces and in Fig. 9 I have schematically represented the control system for operating the machine entirely automatically in timed sequence. The line wires are designated L1 and L2 respectively and the limit switches LS1, LS2, and LS3, electromagnetic relays CR1, CR9, CR4, CR6, CR8, pneumatic control relays CR5 and CR7, and timer relays TD1 and TD2, to be designated are conventional and are of types readily obtainable on the market. When the indexing lever shown in the aforementioned Patent 2,633,777 designated 22 therein moves into the notch in the worktable at the completion of an indexing movement a limit switch LS2 which is open when the lever is not engaged is closed. When the locking wedge designated W in the aforementioned patent moves into the notch to lock the indexing lever and table in indexed position a limit switch LS3, which is open when the wedge is not engaged, is closed. Closing of the limit switch LS3 completes circuit c to the coil of relay CR9 and makes its normally open contacts CR91 which are in circuit d along with limit switch LS2. Upon closing of the limit switch LS2 and relay contacts CR91 the circuit d is complete to the coil of relay CR4 and its normally open contacts CR41 which are in circuit g along with solenoid A which operates the pressure cylinder 85. When contacts CR41 close solenoid A operates a conventional valve V₁ which is actuated to a position in which it passes air into line 86a and bleeds it from line 86 so that the piston 84 is retracted and the weight of the grinding spindle assembly moves the grinding wheel 19 and gauge G into the workpiece W.

When the grinding wheel 19 leaves its indexed or "up" position a limit switch LS1 is closed completing circuit a to the coil of relay CR1 and parallel circuit b to the coil of timer relay TD1. In this manner the normally open contacts CR11 of relay CR1 are closed to provide a circuit d1 in parallel with circuit d. After a short delay to allow the grinding wheel and gauge to descend to position within the workpiece, relay timer coil TD1 also is energized to close contacts TD11 in circuit d. Circuit d' is now closed to the normally open pneumatic relays CR5 and CR7 respectively. When relay CR5 closes contacts CR51 at the "approach" size as previously described the coil of relay CR6 in circuit e is energized and normally open contacts CR61 in circuit h are closed to operate solenoid 68 and disengage lead screw 52. Later, when the finish size is reached and pneumatic relay CR7 closes contacts CR71, the coil of relay CR8 in circuit f is energized to close relay contacts CR81 in circuit i and energize solenoid 103 which operates cylinder 70 and returns lead screw 52 to substantially initial position. The solenoid 103 similarly operates a conventional valve V2 which is actuated to a position in which it supplies air under pressure to line 71 while permitting it to bleed from line 71a.

A timer relay TD2 is in parallel with relay CR8 and after a short delay it is energized to open normally closed contacts TD21 and break the circuit d to relay coil CR4. Of course, when relay CR4 is deenergized contacts CR41 open and solenoid A is deenergized. The conventional valve V1 which was operated by solenoid A is spring returned to its original position in which it passed air in through line 86 and bled it from line 86a and accordingly the grinding wheel assembly will be lifted from the workpiece when piston 84 descends. The delay provided by timer relay TD2 assures that the grinding wheel will be returned radially inwardly to a position out of engagement with the interior wall of the workpiece by the solenoid 103 prior to the time the wheel 19 commences to move out of the workpiece.

As noted previously with respect to solenoid 103, the air cylinder 85 could be eliminated for purposes of this specification if solenoid A were of the same type as solenoid 68 and had an extended core of the shape of piston rod 84. Also if a limit switch LS1 is employed the arms 113 can be eliminated since when the grinding spindle assembly reaches its "up" position limit switch LS1 is opened and relay coil CR1 is deenergized so that its contacts CR11 open. With circuits e and f thus opened relay coils CR6 and CR8 are deenergized and their respective normally open contacts CR61 and CR81 are opened. Upon the opening of contacts CR61 solenoid core 68a returns to original position to permit pawl 56 to return to ratchet wheel 57, and upon the opening of contacts CR81 solenoid 103 is deenergized and the conventional spring returned valve V2 it actuates returns to original position so that air is being forced through line 71a and is bled from line 71. This, of course, returns lever 74 to original position. As the grinding assembly ascends to up position it also closes a limit switch which is electrically connected to the motor driving the indexing table T and to means for withdrawing first the table locking wedge and then the table indexing lever which are described in the aforementioned patent. When the wedge and indexing lever have moved outwardly, the table T indexes to bring the next workpiece under the wheel 19 and the grinding operation described is repeated. The means for driving the table T and actuating the indexing lever and wedge need not be further described inasmuch as they are conventional or are shown in the patent referred to. When the gauge G is descending toward the next workpiece in the succeeding grinding operation and the tapered diamonds 94a and 95a on jaws or arms 94 and 95 engage the edge of the interior wall the spread apart jaws tend to be compressed because the diamond engaging inserts 94a and 95a are tapered and readily enter the workpiece.

Figure 11:
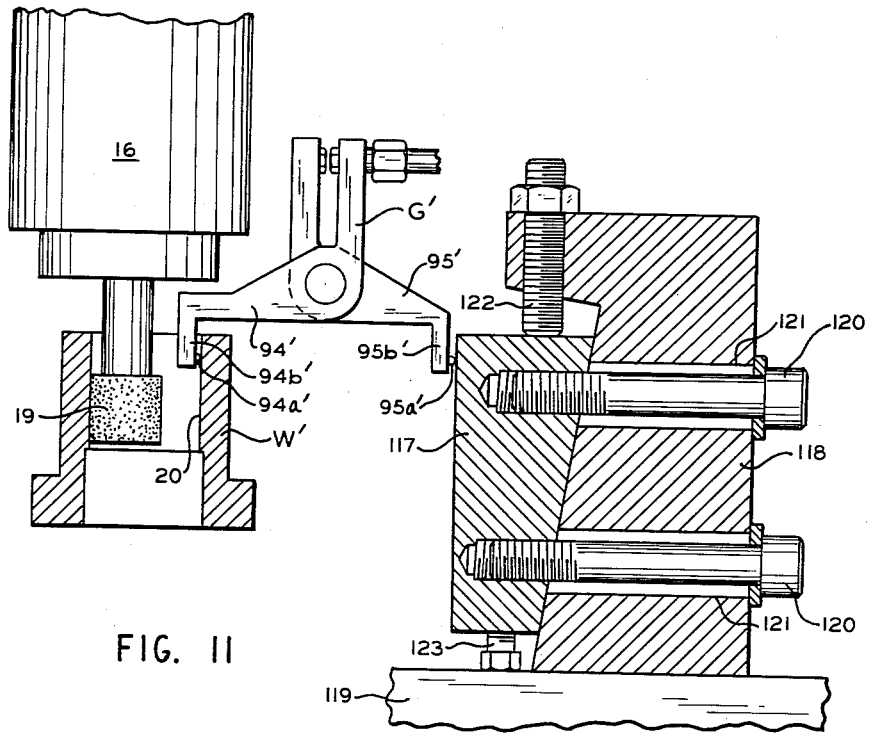
Fig. 11 is a fragmentary, side elevational view showing how the control gauges can be mounted when workpieces of reduced internal diameter are being ground.

In Fig. 11 I have shown a workpiece which has a bore of such a reduced diameter that a gauge G could not be practically inserted to signal the necessary measurements. The gauge is accordingly supported as shown and jaws 94' and 95' are angular in shape and have depending fingers 94b' and 95b' on which the diamonds 94a' and 95a' are mounted. The one finger 94b' is disposed within the workpiece W' while the other finger 95b' is disposed adjacent a gauge block 117. The wedge shaped block 117 is secured to a support 118 provided on a bracket 119 extending from head H by means of clamp bolts 120 which extend through enlarged openings 121 in the support 118. If bolts 120 are backed off slightly and setscrews 122 and 123 are adjusted obviously the position of gauge block 117 can be varied as desired. The gauge G' shown operates in exactly the same manner as previously described and plainly with this practical arrangement I have greatly extended the range of workpieces which can be automatically ground to size on the machine.

While I have shown and described the head H in connection with an internal grinding operation obviously it will be very useful for other machining operations as well and I wish it understood that I do not intend that the invention be limited in any way to the operation described.

Further it is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. In a grinder, support means, a grinding spindle assembly reciprocable and pivotal thereon, a grinding wheel on said assembly, a workholder having a workpiece therein with a bore in substantially axial alignment with said wheel, means for driving said wheel, means for moving said grinding spindle assembly substantially axially to dispose the grinding wheel within the bore of the workpiece, a gauge having at least a portion thereof inside the bore of the workpiece to measure the same during the grinding operation, means for moving said grinding spindle assembly axially in a grinding stroke, means drivingly connected with said last means pivoting said assembly and moving the grinding wheel laterally into the interior wall of the workpiece an increment during each stroke, means connected with said gauge disabling the said driving connection and interrupting the lateral feed of the wheel when the workpiece has been ground to a predetermined diameter, and means removing said grinding spindle assembly and wheel from said workpiece to permit substitution of another workpiece when a second different predetermined diameter is gauged.

2. The combination defined in claim 1 in which said gauge is carried by said grinding spindle assembly in a manner such that it is removed from said workpiece therewith when workpieces are to be substituted.

3. In a grinder, support means, a grinding spindle assembly reciprocable on said support means and pivotal simultaneously thereon, a tool on said assembly, an oscillatable rock shaft having a crank arm thereon connected to said assembly to move the assembly in a grinding stroke when the rock shaft pivots a second crank arm on said shaft, cam means for pivoting said rock shaft by oscillating said second arm, and means for simultaneously pivoting said assembly to feed the tool radially during the grinding stroke.

4. In a grinder, a support housing, a grinding spindle assembly, including a grinding tool, pivotal thereon, a lead screw in said housing, a ratchet wheel on said screw, means for actuating said assembly in a grinding stroke, a pawl actuated by said latter means engaging said wheel and turning it an increment with each grinding stroke, means connecting with said assembly offset with respect to its pivotal axis pivoting the assembly an increment with each increment of movement of said screw to feed the tool radially, a second ratchet wheel provided on said lead screw, a pivotal pawl normally out of engagement with the same, and means movable to pivot said pawl into engagement with the said second wheel and return said screw through many increments to substantially its original radial position.

5. In a grinder, a support housing, a grinding spindle assembly, including a grinding tool, reciprocable axially thereon, an oscillatable rock shaft journaled in said housing having a lever arm in engagement with said assembly, a second lever arm for said shaft, and a cam surface outward of said second lever arm so that motion is imparted from only one direction pivoting said shaft to move the spindle assembly upwardly and permitting the weight of the assembly to return the assembly downwardly.

6. In an internal grinder, a support housing, a grinding spindle assembly, including a grinding tool, reciprocable vertically and pivotal on said housing, a workholder supporting a workpiece having a bore in substantially axial alignment with said tool under said tool, a gauge associated with said assembly so that it is raised by the latter having a portion thereof supported within the bore of the workpiece to measure the bore during the grinding operation, a rock shaft journaled in said housing having a lever arm received by said assembly, a second lever arm on said rock shaft, revolvable cam means engaging said latter arm and pivoting the shaft to move the spindle assembly upwardly while permitting the weight of the assembly to return it downwardly in a grinding pass, means for driving the cam means, an axially movable lead screw in said housing, maintained in off center, angularly adjustable, engagement with said assembly, a ratchet wheel fixed on said screw, a collar revolvable on said screw provided with a shoulder thereon, a third lever on said rock shaft having a portion thereof in engagement with the said shoulder when the assembly is at the bottom of its grinding stroke, a pawl pivoted on said collar normally in engagement with the teeth of said ratchet wheel, biasing means urging said collar and pawl in a direction to follow said lever when on the upstroke the said third lever pivots away from the shoulder on the collar and the pawl skips over a tooth on the ratchet wheel as the collar follows, the downstroke on the assembly then causing the said third lever to return the collar to original position and in so doing advancing the ratchet wheel and thereby the lead screw an increment, fluid pressure means for moving said assembly to follow said lead screw as the latter is adjusted during the downstroke to cause the assembly to pivot and the tool to be advanced radially increment by increment into the workpiece with each revolution of the cam means, means actuated by the gauge when a predetermined approach size is ground to disengage said pawl from the ratchet wheel and halt axial adjustment of the screw with each revolution of the cam means, and means actuated by the gauge when the finish size is subsequently ground as the wheel sparks out to pivot said rock shaft sufficiently to raise said assembly and thereby said tool and gauge to a position remote from the workpiece so that the latter can be indexed.

7. The combination defined in claim 6 in which a second ratchet wheel is fixed on said lead screw, a pivotally supported pawl is provided normally out of engagement therewith, and means is provided for pivoting said latter pawl into engagement with the said second ratchet wheel and returning the lead screw to a position just short of its original position at a time just in advance of the time when said tool and gauge are removed from the workpiece.

8. In an internal grinder, a grinding head, a grinding spindle assembly thereon, a workholder independent of said head having workpiece with a bore therein held opposite said assembly, a grinding wheel of reduced diameter relative to said bore disposed therein adjacent a portion of the peripheral wall thereof, a gauge having a pair of caliper levers depending into said bore with the levers partially embracing the wheel but out of engagement therewith, means urging said levers radially outwardly to maintain them in contact with the wall of the bore as the grinding progresses, fluid pressure means regulated by the spread of said levers means carried by said head for feeding said wheel laterally outwardly into the wall of the workpiece means operated by said fluid pressure means actuated when said caliper levers reach a certain position for interrupting said means for feeding the wheel.

9. The method of precision grinding a workpiece to predetermined size which comprises, feeding a grinding tool radially into a workpiece while axially reciprocating the tool, substantially continuously measuring the size of the workpiece during the grinding operation, automatically interrupting the feed of the tool when the gauge indicates that a predetermined approach size has been ground, continuing to reciprocate the tool while the tool sparks out and until a predetermined finish size is ground, and automatically removing the tool and gauge when the latter indicates that the finish size has been ground.

10. In a machine tool for performing multiple grinding operations; a head including a reciprocable tool support carriage; a tool on said carriage; a workholder independent of said head for supporting a workpiece opposite said carriage, gauge means supported by said head for axial movement relative to said workpiece and to said carriage also having a part projecting into the path of said carriage; a surface on said carriage engaging said part to move said gauge out of measuring position when the tool is moved out of machining position, and returning said gauge into measuring position adjacent said workpiece when the tool is returned to machining position; and stop means limiting travel of said gauge means relative to the travel of the carriage once the gauge is in measuring position to permit traversing movement of said carriage which does not affect the position of said gauge.

11. In a machine tool for performing multiple grinding operations; a grinding head including a reciprocable and pivotal tool support carriage; a grinding tool on said carriage; a workholder independent of said head for supporting a workpiece opposite said carriage; gauge means carried by said carriage mounted for axial movement relative to said workpiece and to said carriage also having a part projecting into the path of said carriage; a surface on said carriage engaging said part to move said gauge out of measuring position when the tool is moved out of machining position, and returning said gauge to measuring position adjacent said workpiece when the tool is returned to machining position; means on said head connected to said carriage for pivoting said carriage and thereby feeding said tool laterally to the axis of the tool into the wall of the workpiece and stop means limiting travel of said gauge means relative to the travel of the head once the gauge is back in measuring position to permit traversing movement of said carriage which does not affect the position of said gauge.

12. In a machine tool for performing multiple grinding operations; a grinding head including a reciprocable and pivotal tool support carriage; a revolvable tool on said carriage; means on said carriage for driving said tool; a workholder independent of said head for supporting a workpiece opposite said carriage; gauge means supported by said head for axial movement relative to said workpiece and carriage also having a part projecting into the path of said carriage; a surface on said carriage engaging said part to move said gauge out of measuring position when the tool is moved out of machining position, and returning said gauge into measuring position adjacent said workpiece when the tool is returned to machining position, and means on said head connected to said carriage for pivoting said carriage and thereby feeding said tool laterally to the axis of the tool into the wall of the workpiece.

13. In a machine tool for performing multiple grinding operations; a grinding head including a reciprocable tool support carriage; a tool on said carriage; a workholder independent of said head for supporting a workpiece opposite said carriage; means for reciprocating said carriage in a path in the plane of the axis of said workholder; gauge means carried by said carriage for axial movement relative to said workholder and the workpiece it carries, said gauge means being mounted on said carriage to permit relative movement of said carriage with respect to said gauge means during moving of said carriage to position; and means raising said gauge when the carriage is raised to remove the tool from the workpiece, and returning it to position when the tool is returned to position while permitting movement of said carriage relative to the gauge.

14. In a machine tool for performing grinding operations, a head, a workholder for holding a workpiece, a tool assembly pivotal on said head and simultaneously reciprocable along the axis of pivot toward and away from said workholder, a tool on said assembly, a feed screw engaging said spindle assembly at a point remote from its axis of pivot movable to push said assembly about its axis of pivot and thus feed said tool laterally to the axis of the workholder and workpiece, an oscillatable rock shaft substantially parallel to said feed screw connected to said assembly for reciprocating the same in a grinding stroke, and cam means operating said rock shaft.

15. In a machine tool for performing grinding operations, a head, a workholder for holding a workpiece, a tool assembly pivotal on said head and simultaneously reciprocable along the axis of pivot, toward and away from said workholder, a tool on said assembly, a feed screw engaging said spindle assembly at a point remote from its axis of pivot movable to push said assembly about its axis of pivot and thus feed said tool laterally to the axis of the workholder and workpiece, an oscillatable rock shaft substantially parallel to said feed screw connected to said assembly for reciprocating the same in a grinding stroke, cam means operating said rock shaft, and cooperable means connected between said rockshaft and feed screw moving said feed screw at least one increment with each oscillation of the rockshaft for progressively advancing said tool into the wall of the workpiece.

16. In a machine tool for performing grinding operations, a head, a workholder for holding a workpiece, a tool assembly pivotal on said head and simultaneously reciprocable along the axis of pivot, toward and away from said workholder, a tool on said assembly, a feed screw connected to said spindle assembly at a point remote from its axis of pivot movable to push said assembly about its axis of pivot and thus feed said tool laterally to the axis of the workholder and workpiece, means connected to said assembly for reciprocating the same in a grinding stroke, rotating cam means operating said latter means, and means connecting said means for reciprocating the assembly with the feed screw operating the feed screw therefrom.

17. In a grinder; a support housing; a grinding spindle assembly, including a grinding tool, pivotal thereon; a lead screw in said housing; a ratchet wheel on said screw; means for actuating said assembly in a grinding stroke; a pawl actuated by said latter means engaging said wheel and turning it an increment with each grinding stroke; means connecting with said assembly, offset with respect to its pivotal axis, pivoting the assembly an increment with each increment of movement of said screw to feed the tool radially; said assembly being in engagement with the lead screw but not rotating therewith, and a pressure fluid cylinder for continually urging said assembly against said lead screw and feeding said wheel radially as the lead screw retreats.

18. In a machine tool for performing multiple grinding operations; a head; tool support means on said head including a tool thereon; guide means for reciprocating said tool support means; a work holder independent of said head for holding a workpiece therein; gauge means carried by said head, movable with said tool support means into and out of position, to measure said workpiece while the tool is performing a machining operation on the workpiece, said gauge means having at least one indicating element; means for rotating at least one of said tool support means and work holder; means carried by said head for feeding said tool support means laterally to the axis of the workpiece into engagement with the wall of the workpiece; motion transmission means connecting said drive means for reciprocating said carriage and said means for feeding said tool support means laterally; means connected between said gauge means and means feeding said tool support means laterally for disabling said motion transmission means when said gauge element indicates a predetermined size has been reached; and means for removing said gauge and tool from said workpiece.

19. In a machine tool for performing multiple grinding operations; a reciprocable grinding spindle assembly, driving means reciprocating said assembly; an indexable work holder independent of said assembly having a workpiece therein in substantially axial alignment with said grinding spindle assembly; a grinding wheel on the assembly; means for revolving one of the wheel and workpiece; a gauge positioned adjacent to the workpiece to measure the latter during the grinding operation; a movable element on said gauge movable through a range of movement; means for feeding said grinding wheel and workpiece relatively laterally, one to the other; means connected to said gauge and to said lateral feeding means responsive to one position of said gauge element for halting the operation of said lateral feeding means when the gauge element indicates that a predetermined size has been reached; means connected to said grinding spindle assembly for removing the wheel and gauge axially from the workpiece; and means connecting said gauge and means for removing the wheel and gauge axially, operable, when said element of said gauge reaches a second different predetermined position, for removing the wheel and gauge axially from the workpiece.

20. The combination defined in claim 19 in which said means connected to said gauge and to said lateral feeding means and said means connecting said gauge and said means for removing the wheel and gauge axially from the workpiece includes a fluid pressure line with the pressure therein controlled by the position of the gauge element, and means connected to said lateral feeding means and to said workpiece and gauge removing means energized selectively when a particular pressure in the line is reached.

21. In a grinder, a grinding head, a grinding spindle assembly thereon, a work holder independent of said head having a workpiece held therein opposite said assembly, said workpiece having a peripheral wall, a grinding wheel disposed radially adjacent a portion of the peripheral wall of the workpiece, means feeding said wheel radially into the said wall of the workpiece, a gauge having at least one indicating lever extending into adjacency with said wall of said workpiece, means urging said lever outwardly in a direction angular to the axis of the grinding wheel and aligned with the feed of the wheel to maintain it in contact with the said wall of the workpiece as the grinding progresses, fluid pressure means regulated by the spread of said lever as said wheel is fed radially into the said wall of the workpiece, and means operated by said fluid pressure means actuated when said lever reaches a certain predetermined position for interrupting said means for feeding the wheel.

22. In a machine tool for performing multiple grinding operations: a head having a reciprocable tool support carriage; a tool thereon; drive means for reciprocating said carriage; a work holder independent of said head having a workpiece therein; gauge means carried by said carriage movable with said carriage into and out of position to measure said workpiece while the tool is performing a machining operation on the workpiece, said gauge means having at least one element movable through a range of movement; means for driving at least one of said tool and workholder; means carried by said head for feeding said tool laterally to the axis of the workpiece into engagement with the wall of the workpiece; motion transmission means drivingly connecting said drive means for reciprocating said carriage and said means for feeding said tool laterally for operation in synchronism; means connected between said gauge and means feeding said tool laterally for disabling said motion transmission means when said gauge element reaches a predetermined position; and means carried by said head associated with said gauge for relatively moving said tool carriage and workpiece axially to positions remote from one another when said gauge element indicates that a desired size has been reached to permit removal of said workpiece and replacement thereof.

23. In a machine tool for performing multiple grinding operations: support means; a reciprocable tool carriage thereon; drive means for reciprocating said carriage; an indexible workholder independent of said support means having a workpiece therein; gauge means carried by said carriage into and out of a position proximate to said workpiece to measure said workpiece while the tool is performing a machining operation on the workpiece; said gauge means having an indicating element; means on said carriage for driving said tool; means for feeding said tool carriage and thereby said gauge laterally into the workpiece; interconnecting means drivingly connecting said drive means for reciprocating said carriage and said means for feeding said tool laterally for operation in synchronism; means connected between said gauge and means feeding said carriage radially for disabling said interconnecting means when said gauge element indicates a predetermined size has been reached; and means carried by the support means for interrupting said feed and removing said gauge and tool when the gauge indicates that a desired size has been reached.

24. In a grinder; support means; a reciprocable grinding spindle assembly thereon; driving means reciprocating said assembly; an indexible workholder independent of said support means having a workpiece therein in substantially axial alignment with said grinding spindle assembly; a grinding wheel on the latter; means for driving the wheel; a gauge carried by said assembly in position adjacent the workpiece to measure the latter during the grinding operation; means on said gauge responsive separately to two different sizes ground on said workpiece; means carried by said support means and drivingly connected with said driving means for reciprocating said assembly so as to be driven thereby for feeding said grinding wheel laterally to the axis of the workpiece into the workpiece, means connecting said gauge and driving connection of said means reciprocating said assembly and means laterally feeding said wheel for halting the lateral feed of the wheel when the gauge indicates that the first predetermined size has been reached; and means for removing the wheel and gauge axially from the workpiece when the gauge thereafter indicates that the second finish size has been reached.

25. In an upright machine tool for performing grinding operations, a head, a work holder for holding a workpiece, a tool assembly pivotal on said head, means for relatively axially moving one of said work holder and tool assembly, a tool on said assembly, a part connected to said tool assembly at a point remote from its axis of pivot movable to actuate said assembly about its axis of pivot and thus feed said tool laterally to the axis of the work holder and workpiece and to move said assembly about its axis of pivot and return said assembly; means connected to said assembly for reciprocating the same in a grinding stroke, and means connecting said means for reciprocating the assembly and part operating to actuate said part and return it.

References Cited in the file of this patent

UNITED STATES PATENTS

| | | |
|---|---|---|
| Re. 16,141 | McDonough | Aug. 11, 1925 |
| 1,051,483 | Bryant | Jan. 28, 1913 |
| 1,684,486 | Guild et al. | Sept. 18, 1928 |
| 1,705,749 | Bryant | Mar. 19, 1929 |
| 1,770,148 | Stevens | July 8, 1930 |
| 1,817,953 | Stevens | Aug. 11, 1931 |
| 1,884,309 | Shippy et al. | Oct. 25, 1932 |
| 1,926,214 | Raule | Sept. 12, 1933 |
| 2,004,361 | Arms | June 11, 1935 |
| 2,013,122 | Arms | Sept. 3, 1935 |
| 2,070,283 | Lewis | Feb. 9, 1937 |
| 2,631,414 | Muehling | Mar. 17, 1953 |

FOREIGN PATENTS

| | | |
|---|---|---|
| 469,009 | Great Britain | July 12, 1937 |